United States Patent
Yang et al.

[19]

[11] Patent Number: 6,007,726

[45] Date of Patent: Dec. 28, 1999

[54] STABLE OXIDIZING BROMINE FORMULATIONS, METHODS OF MANUFACTURE THEREOF AND METHODS OF USE FOR MICROBIOFOULING CONTROL

[75] Inventors: Shunong Yang; William F. McCoy, both of Naperville, Ill.

[73] Assignee: Nalco Chemical Company, Naperville, Ill.

[21] Appl. No.: 09/069,653

[22] Filed: Apr. 29, 1998

[51] Int. Cl.[6] ...................................................... C02F 1/50
[52] U.S. Cl. ........................... 210/752; 162/161; 210/755; 210/759; 210/760; 210/764; 422/37; 423/472; 424/613; 424/723
[58] Field of Search .............................. 162/161; 210/754, 210/755, 759, 760, 758, 764, 752; 252/180; 422/37; 423/462, 472; 424/613, 723

[56] References Cited

U.S. PATENT DOCUMENTS

| | | | |
|---|---|---|---|
| 3,222,276 | 12/1965 | Belohlav et al. | 210/754 |
| 3,328,294 | 6/1967 | Self et al. | 210/755 |
| 3,493,654 | 2/1970 | Goodenough et al. | 424/127 |
| 3,558,503 | 1/1971 | Goodenough et al. | 252/187 |
| 4,759,852 | 7/1988 | Trulear | 210/699 |
| 4,792,407 | 12/1988 | Zeff et al. | 210/748 |
| 4,992,209 | 2/1991 | Smyk et al. | 252/387 |
| 5,264,136 | 11/1993 | Howarth et al. | 210/754 |
| 5,565,109 | 10/1996 | Sweeny | 210/755 |
| 5,589,106 | 12/1996 | Shim et al. | 252/387 |
| 5,603,840 | 2/1997 | Strittmatter et al. | 210/698 |
| 5,683,654 | 11/1997 | Dallmier et al. | 422/14 |

FOREIGN PATENT DOCUMENTS

| | | |
|---|---|---|
| 0 168 253 A2 | 1/1986 | European Pat. Off. . |
| WO96/14092 A1 | 5/1996 | WIPO . |
| WO96/30562 | 10/1996 | WIPO . |
| WO97/20909 | 6/1997 | WIPO . |
| WO97/43392 | 11/1997 | WIPO . |

Primary Examiner—Peter A. Hruskoci
Attorney, Agent, or Firm—Kelly L. Cummings; Thomas M. Breininger

[57] ABSTRACT

Stable oxidizing biocide formulations containing bromine are provided for biofouling control in industrial water systems. The formulations contain at least one stable oxidizing bromine compound that is prepared from at least one oxidizing chemical reagent, at least one bromine source and at least one bromine or halogen stabilizer. The resulting products are a mixture of stable oxidizing bromine compounds that can be used as a primary or secondary biocide in an industrial water system.

28 Claims, 1 Drawing Sheet

STABLE OXIDIZING BROMINE FORMULATIONS, METHODS OF MANUFACTURE THEREOF AND METHODS OF USE FOR MICROBIOFOULING CONTROL

BACKGROUND OF THE INVENTION

The present invention relates to formulations used in biofouling control in industrial water systems. More specifically, the present invention relates to methods of preparing stable oxidizing bromine formulations and their use in biofouling control in industrial water systems.

Ozone is known to be an effective biocide and is used to control biofouling in various industrial water applications. However, ozone is also very reactive with other water treatment chemicals such as corrosion and scale inhibitors. As a result, it is difficult to maintain a residual ozone concentration in a system thereby substantially reducing the effectiveness of ozone as a biocide.

In an effort to overcome the deficiencies of ozone, the combination of ozone and bromine has been used. One method utilizes ozone activated hypobromite to increase the biocide residual concentration in the system and to reduce the reaction of ozone with other water treatment chemicals. However, bromine species such as $OBr^-$, $HOBr$ and $Br_2$ are produced and are all both unstable and aggressive against water treatment chemicals as well.

Methods of generating stabilized hypobromite for use at levels of less than 100 ppm as a secondary disinfectant during water ozonation are also known. The ozonation processes are carried out at a pH of about 8.5. Compounds used to stabilize the hypobromite include 5,5-dimethylhydantoin and succinamide.

Thus, while bromine compounds such as hypobromite have been used as secondary disinfectants or have been generated for on-site use without concern for stabilization of the bromine, to date, there has been only one successful method for providing oxidizing bromine formulations that are stable and that can be used for biofouling control. Therefore, methods of generating higher concentrations of stable oxidizing bromine formulations in a safer manner are needed so that such stable oxidizing bromine formulations can be combined with ozone and be an effective biofouling control system.

SUMMARY OF THE INVENTION

The present invention satisfies the aforementioned needs by providing a method of generating a stable oxidizing bromine compound and an aqueous biocide solution containing a stable oxidizing bromine formulation. The method of the present invention can be used to generate stable oxidizing bromine compounds and aqueous solutions containing stable oxidizing bromine compounds for use in biofouling control in industrial water systems.

In an embodiment, the method of the present invention for generating at least one stable oxidizing bromine compound in an aqueous solution includes the steps of providing a solution comprising an alkali or alkaline earth metal bromide and a halogen stabilizer selected from the group consisting of $R—NH_2$, $R—NH—R^1$, $R—SO_2—NH_2$, $R—SO_2—NHR^1$, $R—CO—NH_2$, $R—CO—NH—R^1$ and $R—CO—NH—CO—R^1$ wherein R is a hydroxy group, an alkyl group or an aromatic group and $R^1$ is an alkyl group or an aromatic group, followed by the step of adjusting the solution to a pH ranging from 4 to 8, followed by the step of adding an oxidizer to the solution.

In an embodiment, the method further includes the step of adjusting the solution to a temperature ranging from about 0° to about 60° C., preferably from about 4° C. to about 21° C., after the oxidizer is added to the solution.

In an embodiment, the method of the present invention further includes the step of adjusting the pH of the solution to a range of greater than 13 after the oxidizer is added to the solution.

In an embodiment, the oxidizer is ozone.

In an embodiment, the alkali or alkaline earth metal bromide is NaBr.

In an embodiment, the step of adjusting the pH of the solution prior to the addition of the oxidizer further comprises adjusting the pH to a level of about 7.

In an embodiment, the present invention is a method of treating an industrial water system with a stable oxidizing bromine compound. The method includes the steps of providing a vessel, providing a solution comprising an alkali or alkaline earth metal bromide and a halogen stabilizer selected from the group consisting of $R—NH_2$, $R—NH—R^1$, $R—SO_2—NH_2$, $R—SO_2—NHR^1$, $R—CO—NH_2$, $R—CO—NH—R^1$ and $R—CO—NH—CO—R^1$ wherein R is a hydroxy group, an alkyl group or an aromatic group and $R^1$ is an alkyl group or an aromatic group, followed by the step of adjusting the pH of the solution to a range from about 4 to about 8, followed by the step of injecting a gaseous oxidizer into the solution to produce stable oxidizing bromine compounds, followed by the step of adding the solution to an industrial water system for biofouling control.

In an embodiment, the method of the present invention further includes the step of adding gaseous oxidizer to the industrial water system upstream of a point where the stable oxidizing bromine compound is added to the system.

In an embodiment, the present invention provides a method of treating an industrial water system with a primary biocide and a secondary biocide for biofouling control. The method includes the steps of providing a solution in a first vessel, the solution comprising an alkali or alkaline earth metal bromide and a halogen stabilizer selected from the group consisting of $R—NH^2$, $R—NH—R^1$, $R—SO_2—NH_2$, $R—SO_2—NHR^1$, $R—CO—NH_2$, $R—CO—NH—R^1$ and $R—CO—NH—CO—R^1$ wherein R is a hydroxy group, an alkyl group or an aromatic group and $R^1$ is an alkyl group or an aromatic group, the solution further having a pH ranging from about 4 to about 8, followed by the step of adding a gaseous oxidizer to the solution in the first vessel, at least some of the gaseous oxidizer reacting with the alkali or alkaline earth metal bromide and wherein at least some of the gaseous oxidizer has not reacted with the alkali or alkaline earth metal bromide and halogen stabilizer to serve as a supply of unreacted gaseous oxidizer, followed by the step of adding the unreacted gaseous oxidizer to the industrial water system as the primary biocide, followed by the step of adding the stable oxidizing bromine compounds to the industrial water system as the secondary biocide.

In an embodiment, the method further comprises the steps of transferring the solution to a second vessel and thereafter increasing the pH of the solution to a level greater than 13 so as to stabilize the hypobromite solution thereby extending its useful life thereby permitting the operator to add the solution to the industrial water system on an "as needed" basis.

In an embodiment, a method of the present invention provides a method of generating at least one stable oxidizing bromine compound, the method includes the steps of providing a solution comprising an alkali or alkaline earth metal bromide and a halogen stabilizer selected from the group consisting of at least one sulfamate and sulfonamide, followed by the step of adjusting the pH of the solution to a range from 4 to 8, and followed by the step of adding an oxidizer to the solution selected from the group consisting of ozone, hydrogen peroxide and peracetic acid.

It is therefore an advantage of the present invention to generate a stable oxidizing bromine solution in a safe and efficient manner whereby no bromine fumes are generated.

It is another advantage of the present invention to generate stable oxidizing bromine compounds in a limited number of steps without the need for a separate step for the hypobromite generation.

Another advantage of the present invention is that it provides stable oxidizing bromine compound in a high concentration without a direct use of a concentrated form of unstabilized bromine.

Still another advantage of the present invention is that it provides a method for generating stable oxidizing bromine compounds without unwanted by-products such as high levels of bromate.

Still another advantage of the present invention is that the method of the present invention does not generate chloride and therefore the method of the present invention provides stable oxidizing bromine formulations that are less corrosive.

Yet another advantage of the present invention is that it provides stable oxidizing bromine compounds that are safer to transport.

Still another advantage of the present invention is that it generates very little bromate.

Yet another advantage of the present invention is that it generates stable oxidizing bromine compounds for biofouling control that are more compatible with other water treatment chemicals.

And another advantage of the present invention is that the stable oxidizing bromine compound provided can be used as either sole biofouling control agents or as secondary biofouling control agents.

Another advantage of the present invention is that it provides an improved method of microbiofouling control in pulp and paper processing systems.

Another advantage of the present invention is that it provides an improved method of microbiofouling control in a food processing system.

Yet another advantage of the present invention is that it provides improved microbiofouling control in a beverage processing system.

Still another advantage of the present invention is that it provides improved microbiofouling control in a recreational water system.

And another advantage of the present invention is that it provides an improved method of disinfecting a hard surface.

Other objects and advantages of the present invention will be apparent upon a review of the following detailed description and appended claims.

DETAILED DESCRIPTION OF THE PRESENTLY PREFERRED EMBODIMENTS

Figure 1:
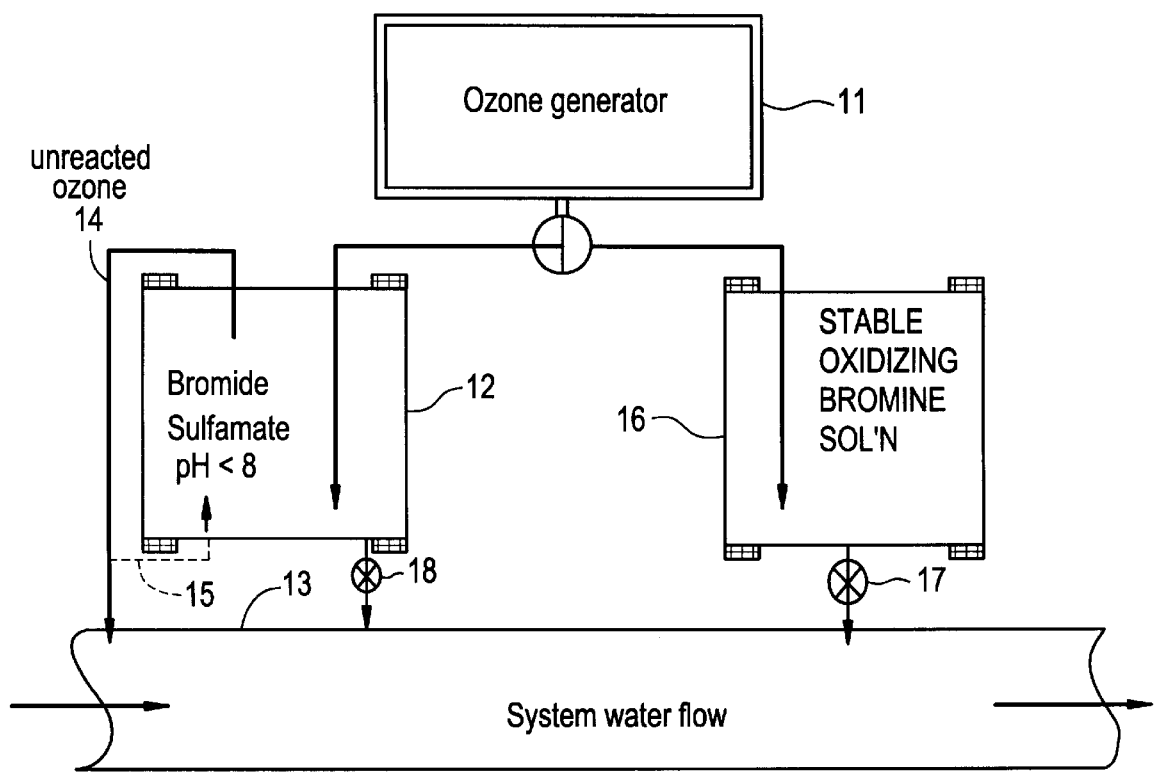
FIG. 1 illustrates schematically an apparatus for generating stable oxidizing bromine compounds for use in an industrial water system.

The present invention provides a plurality of formulations and methods for generating a wide concentration of stable oxidizing bromine compounds that can be used as primary or secondary biofouling control agents in cooling water and other industrial systems. While ozone is discussed as an example oxidizer for the methods described herein, it will be noted that other oxidizers such as peroxides, peracetic acid and other peroxygen compounds, and oxidizing bromine compounds can also be used as an oxidizer or primary oxidizer.

When using ozone as an oxidizer, the stable oxidizing bromine compound products are formed by directly ozonating a mixture solution of a sodium bromide and a sodium sulfamate (or other primary or secondary amines, or amides which are stable in an ozone environment) at an optimal pH range. In the formulation, ozone serves as the oxidizer, bromide salt as the bromine source, and sulfamate as the oxidizing bromine stabilizer. In the pre-ozonation solution, bromide and sulfamate are added in equal molar amounts. The pH of the solution is adjusted by the addition of caustic (sodium hydroxide) or acid. The optimal solution pH for the process ranges from 4 to 8.

Without being limited by theory, the reaction mechanism is believed to be the following sequential chemical reactions:

$$Br^- + O_3 \rightarrow BrO^- \quad (1)$$

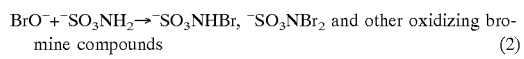

$$BrO^- + {}^-SO_3NH_2 \rightarrow {}^-SO_3NHBr, {}^-SO_3NBr_2 \text{ and other oxidizing bromine compounds} \quad (2)$$

The second reaction starts as soon as trace amounts of hypobromite are generated in the first reaction. It is known that unstabilized hypobromite is very corrosive and more volatile than stabilized hypobromite. The in-situ stabilization process described herein minimizes the loss of hypobromite by chemical decomposition and physical evaporation. In addition, one of the major decomposition by-products of hypobromite is bromate. It has been confirmed that methods practices in accordance with the present invention produce no detectable bromate (or less than 50 ppm of bromate in 5.2% stabilized hypobromite product).

As a result, a higher ozonation efficiency is achieved when the stabilizer is added when compared to conventional bromide ozone conversion. Further, no significant bromine loss occurs with the addition of the stabilizer after long-term ozonation of up to 30 hours. Further, the sulfamate is not degraded by the ozone. The step of lowering the pH to a range from 4 to 8 prior to the oxidation is important. At pH levels of greater than 8, OH radicals formed are much more reactive and undiscriminative than ozone. As a result, at pH levels greater than 8, OH radicals formed from ozonation will react with sulfamate and stable oxidizing bromine compounds which result in no stable oxidizing bromine compounds formation. Table 1 illustrates the dependence of stable oxidizing bromine compounds formation on reaction pH and product concentration with ozonation time. Table 2 illustrates the relationship between stable oxidizing bromine formation and ozonation time. As shown in Table 1, no stable oxidizing compounds are formed until the reaction pH is lowered below 8. This phenomenon was previously unknown.

TABLE 1

Ozone activation and in-situ stabilization of oxidizing bromine.

| Ozonation time (min) | Concentration of stable oxidizing bromine product (PPM as $Cl_2$) | pH of the solution |
|---|---|---|
| 5 | 7.1 | 13 |
| 15 | 9.5 | — |
| 25 | 8.2 | — |
| 35 | 130.4 | — |
| 45 | 1318 | — |
| 60 | 3980 | 7.42 |
| 120 | 12360 | 5.68 |
| 180 | 23340 | 5.38 |

TABLE 2

Formation of stable oxidizing bromine compounds by ozonation.

| Ozonation time (hr) | Product Concentration (% as $Cl_2$) |
|---|---|
| 1 | 1.703[a] |
| 2 | 2.912[a] |
| 3 | 3.685[a] |
| 4 | 4.845[a] |
| 6 | 5.240[b] |
| 7 | 5.820[b] |
| 8 | 6.124[b] |
| 9 | 6.280[b] |
| 10 | 6.386[b] |

[a]concentration measured by KI-DPD titration
[b]concentration measured by KI-thiosulfate titration Although a low pH (4–8) is optimal for product formation when ozone is used as the oxidant, thermal stability of the stable oxidizing bromines decreases as pH decreases. As a result, it is important to maintain the high reaction pH and low reaction temperature (optimally 4° C. to 21° C.) and to thereafter adjust the product pH up to a level greater than 13 once the process is complete. These additional steps insure the long-term stability of the product as it is believed that the product will undergo decomposition at elevated temperatures and/or low pH in accordance with the following reaction:

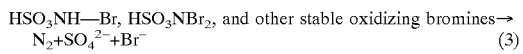

$HSO_3NH-Br$, $HSO_3NBr_2$, and other stable oxidizing bromines→
$N_2 + SO_4^{2-} + Br^-$     (3)

In another embodiment, a direct field process was used for on-site generation of stable oxidizing bromine compounds. Again, ozone is used as an oxidant because it is used extensively in field operations. Ozonators like that shown at 11 in FIG. 1 are found at many application sites. Ozone is supplied from the generator 11 through the reactor 12 and is injected in the system stream 13 through the conduit 14 as the primary biocide. The reaction vessel 12 already includes a solution of alkali or alkaline earth metal bromide, a halogen stabilizer which may be sulfamate and a pH ranging from 4 to 8. Ozone may be recycled back into the reactor 12 through the return line 15. The ozonation time required for complete conversion can be predetermined or measured with a color wheel since the available halogen concentration linearly correlates with light absorption from 400 to 600 nm, preferably measured at 460 nm. The stable oxidizing bromine compounds may then be transferred from the reactor 12 to the storage vessel 16 where it can be added to the water stream 13 through the valve 17 on an "as-needed" basis.

EXAMPLE I

By way of example, a synthesis of stabilized oxidizing bromine compound can be carried out as follows. 14.4 grams of 50% aqueous NaOH, 17.47 grams of sulfamic acid, 41.4 grams of 45% aqueous sodium bromide and 26.99 grams of water are mixed in a 250 ml graduated cylinder. The pH of the solution is about 7.0. Ozonation is carried out by bubbling ozone gas through a fritted glass extended to the bottom of the cylinder. A PCI ozonator (Model GL-1, maximum ozone output: 454 grams/day) was used for ozone generation and operated at 75% output capacity with about half of the gas flow going to the cylinder. After 7 hours of ozonation, the solution pH was measured at 5.6. Then, sodium hydroxide was added slowly to the solution to raise the pH to 13.3. The final volume of the solution was about 60 ml. The available halogen concentration was determined to be 12.85% as $Br_2$ by potassium iodide-thiosulfate titration.

EXAMPLE II

By way of another example, 7.24 grams of 50% aqueous NaOH, 8.75 grams of sulfamic acid, 20.68 grams of 45% aqueous sodium bromide and 63.31 grams of water were combined in a 250 ml graduated cylinder. The solution pH was adjusted to 7 by dropwise addition of additional sodium hydroxide solution. Ozonation was carried out by bubbling the ozone through a fritted glass extended to the bottom of the cylinder using a PCI ozonator operated at 15% output capacity. After 10 hours of ozonation, the total residual oxidant concentration of the resulting solution was determined by potassium iodide-thiosulfate titration to be 14.38% as $Br_2$. It was calculated that more than 98% of the bromide was converted and overall ozonation efficiency for the entire time span was estimated to be at 28.5%. Table 2 shows that the product concentration increases with ozonation time.

EXAMPLE III

By way of another example, using the apparatus illustrated in FIG. 1 for a 100,000 gallon cooling water system, a 1814 grams/day ozonator is utilized. Ozone generated from the ozonator is introduced into the bottom of the reactor 12 through a diffuser (not shown). The 5 liter reactor 12 is filled with a mixture of 389 grams of NaBr, 440 grams of sulfamic acid, 302 grams of 50% aqueous NaOH and 2 liters of water. The pH of the mixture is adjusted to 7 with either NaOH or HCl. The unreacted ozone will be collected at the top of the reactor 12 and introduced into the water stream 13 as the primary biocide. For a 24 hour continuous ozonation and at a 10% ozonation efficiency and at a 100% bromine conversion, 268 grams (as $Cl_2$) of stable oxidizing bromine is generated in the reactor 12. The generated product is then pumped into the cooling water system flow 13 either directly from the reactor 12 or by way of the storage vessel 16. The generated stable oxidizing bromine compounds provide the cooling water system with a reasonable amount of total halogen residue (from 0.1 to 0.7 ppm as available chlorine) which serves as a secondary biocide. If the continuous dosing of stable oxidizing bromine compounds is required, a second reactor 16 can be used for ozonation while product from the first reactor is being injected into the water stream 13 through the valve 18.

The method of the present invention can be used to provide improved microbiofouling control in pulp and paper processing systems, food and beverage processing systems, recreational water systems and, the method of the present invention can be used as a method of disinfecting a hard surface. By way of example only, the present invention may be added to an aqueous media used to transport food through various processing steps and also to disinfect process equipment and waste water streams.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

What is claimed:

1. A method of generating at least one stable oxidizing bromine compound, the method comprising the following steps:

providing a solution comprising an alkali or alkaline earth metal bromide and a halogen stabilizer selected from the group consisting of R—$NH_2$, R—NH—$R^1$, R—$SO_2$—$NH_2$, R—$SO_2$—$NHR^1$, R—CO—$NH_2$, R—CO—NH—$R^1$ and R—CO—NH—CO—$R^1$ wherein R is a hydroxy group, an alkyl group or an aromatic group and $R^1$ is an alkyl group or an aromatic group, adjusting the solution to a pH ranging from about 4 to about 8, adding an oxidizer to the solution wherein said oxidizer is selected from the group consisting of ozone, peracetic acid, hydrogen peroxide and oxidizing bromine compounds, and generating at least one stable oxidizing bromine compound in the solution.

2. The method of claim 1 wherein the alkali or alkaline earth metal bromide is NaBr.

3. The method of claim 1 further comprising the following step prior to the step of adding an oxidizer:

adjusting the solution to a temperature ranging from about 0° C. to about 60° C.

4. The method of claim 1 further comprising the following step after the step of adding an oxidizer:

adjusting the pH of the solution to a range greater than 13.

5. The method of claim 1 wherein the halogen stabilizer is sulfamate.

6. The method of claim 1 wherein the step of adjusting the solution further includes adjusting the pH to a level of about 7.

7. A method of treating an industrial water system with stable oxidizing bromine compounds, the method comprising the following steps:

in a vessel, providing a solution comprising an alkali or alkaline earth metal bromide and a halogen stabilizer selected from the group consisting of R—$NH_2$, R—NH—$R^1$, R—$SO_2$—$NH_2$, R—$SO_2$—$NHR^1$, R—CO—$NH_2$, R—CO—NH—$R^1$ and R—CO—NH—CO—$R^1$ wherein R is a hydroxy group, an alkyl group or an aromatic group and $R^1$ is an alkyl group or an aromatic group, adjusting the solution to a pH ranging from about 4 to about 8, injecting a gaseous oxidizer comprising ozone into the solution, generating stable oxidizing bromine compounds in the solution, and adding the solution to the industrial water system.

8. The method of claim 7 wherein the alkali or alkaline earth metal bromide is NaBr.

9. The method of claim 7 wherein the halogen stabilizer is sulfamate.

10. The method of claim 7 wherein the step of adjusting the pH comprises adjusting the pH to a level of about 7.

11. The method of claim 7 further comprising the following step prior to the step of adding the gaseous oxidizer:

adjusting a temperature of the solution to a range from about 0° C. to about 60° C.

12. The method of claim 7 further comprising the step of adding gaseous oxidizer to the industrial water system upstream of a point where the stable oxidizing bromine compound is added to the system.

13. The method of claim 7 further comprising the following step after the step of adding the gaseous oxidizer:

increasing the pH of the solution to a level greater than 13.

14. A method of treating an industrial water system with a primary biocide and a secondary biocide, the method comprising the following steps:

in a first vessel, providing a solution comprising an alkali or alkaline earth metal bromide and a halogen stabilizer selected from the group consisting of R—$NH_2$, R—NH—$R^1$, R—$SO_2$—$NH_2$, R—$SO_2$—$NHR^1$, R—CO—$NH_2$, R—CO—NH—$R^1$ and R—CO—NH—CO—$R^1$ wherein R is a hydroxy group, an alkyl group or an aromatic group and $R^1$ is an alkyl group or an aromatic group, the solution further having a pH ranging from about 4 to about 8, adding a gaseous oxidizer comprising ozone to the solution in the first vessel, at least some of the gaseous oxidizer reacting with the alkali or alkaline earth metal bromide and the halogen stabilizer to generate stable oxidizing bromine compounds and wherein at least some of the gaseous oxidizer not reacting with the alkali or alkaline earth metal bromide and halogen stabilizer to thereby provide a supply of unreacted gaseous oxidizer, adding the unreacted gaseous oxidizer to the industrial water system as the primary biocide, adding the stable oxidizing bromine compounds to the industrial water system as the secondary biocide.

15. The method of claim 14 wherein the alkali or alkaline earth metal bromide is NaBr.

16. The method of claim 14 wherein the first vessel is maintained at a temperature ranging from about 0° C. to about 60° C.

17. The method of claim 14 wherein the pH of the solution is maintained at a level of about 7.

18. The method of claim 14 wherein the halogen stabilizer is sulfamate.

19. The method of claim 14 further comprising the following step after the step of adding the unreacted gaseous oxidizer and prior to the step of applying the generated stable oxidizing bromine solution to the industrial water system:

adjusting the solution to a pH of greater than 13.

20. The method of claim 14 further comprising the following steps after the step of adding the unreacted gaseous oxidizer and prior to the step of applying the generated stable oxidizing bromine solution to the industrial water system:

transferring the solution to a second vessel, increasing the pH of the solution to a level greater than 13.

21. A method of generating at least one stable oxidizing bromine compound, the method comprising the following steps:

providing a solution comprising an alkali or alkaline earth metal bromide and a halogen stabilizer selected from the group consisting of at least one sulfamate and sulfonamide, adjusting the solution to a pH ranging from about 4 to about 8, adding an oxidizer to the solution selected from the group consisting of ozone, hydrogen peroxide and peracetic acid, generating at least one stable oxidizing bromine compound in the solution, adjusting the pH of the solution to a range greater than 13.

22. A stable oxidizing bromine compound which is prepared by the following steps:

providing a solution comprising an alkali or alkaline earth metal bromide and a halogen stabilizer selected from the group consisting of $R-NH_2$, $R-NH-R^1$, $R-SO_2-NH_2$, $R-SO_2-NHR^1$, $R-CO-NH_2$, $R-CO-NH-R^1$ and $R-CO-NH-CO-R^1$ wherein R is a hydroxy group, an alkyl group or an aromatic group and $R^1$ is an alkyl group or an aromatic group, adjusting the solution to a pH ranging from about 4 to about 8, adding an oxidizer to the solution, wherein said oxidizer is selected from the group consisting of ozone, peracetic acid, hydrogen peroxide and oxidizing bromine compounds, and generating a stable oxidizing bromine compound in the solution.

23. In a method for the control of microbiofouling in an industrial water system in which an oxidizing agent is added to control the microbiofouling, the method comprising using as the oxidizing agent stable oxidizing bromine compound of claim 22.

24. In a method for the control of microbiofouling in a pulp and paper processing system in which an oxidizing agent is added to control the microbiofouling, the method comprising using as the oxidizing agent the stable oxidizing bromine compound of claim 22.

25. In a method for the control of microbiofouling in a food processing system in which an oxidizing agent is added to control the microbiofouling, the method comprising using as the oxidizing agent the stable oxidizing bromine compound of claim 22.

26. In a method for the control of microbiofouling in a beverage processing system in which an oxidizing agent is added to control the microbiofouling, the method comprising using as the oxidizing agent the stable oxidizing bromine compound of claim 22.

27. In a method for the control of microbiofouling in a recreational water system in which an oxidizing agent is added to control the microbiofouling, the method comprising using as the oxidizing agent the stable oxidizing bromine compound of claim 22.

28. In a method of disinfecting a hard surface in which an oxidizing agent is added to disinfect the hard surface, the method comprising using as the oxidizing agent the stable oxidizing bromine compound of claim 22.

* * * * *